United States Patent
Stoner et al.

(10) Patent No.: US 9,386,042 B1
(45) Date of Patent: Jul. 5, 2016

(54) METHODS, SYSTEMS, AND COMPUTER READABLE MEDIUMS FOR UTILIZING GEOGRAPHICAL LOCATION INFORMATION TO MANAGE APPLICATIONS IN A COMPUTER NETWORK SYSTEM

(71) Applicant: VCE Company, LLC, Richardson, TX (US)

(72) Inventors: Thaddeus W. Stoner, Clearwater, FL (US); Todd J. Dolinsky, Chapel Hill, NC (US); Jonathan Fontanez, Jacksonville, FL (US)

(73) Assignee: VCE Company, LLC, Richardson, TX (US)

( * ) Notice: Subject to any disclaimer, the term of this patent is extended or adjusted under 35 U.S.C. 154(b) by 0 days.

(21) Appl. No.: 14/509,387

(22) Filed: Oct. 8, 2014

(51) Int. Cl.
*H04L 29/06* (2006.01)
*G06F 17/30* (2006.01)

(52) U.S. Cl.
CPC .......... *H04L 63/20* (2013.01); *G06F 17/30241* (2013.01)

(58) Field of Classification Search
CPC .......................... H04L 63/20; G06F 17/30241
USPC ............................................................. 726/1
See application file for complete search history.

(56) References Cited

U.S. PATENT DOCUMENTS

| | | | | |
|---|---|---|---|---|
| 7,360,248 B1* | 4/2008 | Kanevsky | ............... | G06F 21/31 726/21 |
| 8,060,717 B2* | 11/2011 | Norman | ................... | G11C 5/02 365/129 |
| 2005/0153687 A1* | 7/2005 | Niemenmaa | ........ | H04L 12/2854 455/414.2 |
| 2005/0177735 A1* | 8/2005 | Arnouse | ................. | G06F 21/32 713/186 |
| 2006/0075487 A1* | 4/2006 | Pfleging | .................. | G06F 21/88 726/21 |
| 2006/0187858 A1* | 8/2006 | Kenichi | ................ | H04W 36/08 370/254 |
| 2006/0195889 A1* | 8/2006 | Pfleging | .............. | H04L 61/2015 726/4 |
| 2008/0222707 A1* | 9/2008 | Pathuri | .................... | G06F 21/62 726/4 |
| 2008/0222734 A1* | 9/2008 | Redlich | ................. | G06F 21/577 726/26 |
| 2009/0328203 A1* | 12/2009 | Haas | .................... | G06F 21/6218 726/20 |
| 2010/0017874 A1* | 1/2010 | Piccinini | ................. | G06F 21/71 726/18 |
| 2010/0146394 A1* | 6/2010 | Morris | .............. | G06F 17/30241 715/733 |
| 2011/0191862 A1* | 8/2011 | Mandava | ............... | H04W 12/08 726/28 |
| 2015/0040210 A1* | 2/2015 | Faaborg | .................. | G06F 21/00 726/16 |
| 2015/0264564 A1* | 9/2015 | Vanderhulst | .......... | H04W 12/06 726/3 |
| 2015/0304325 A1* | 10/2015 | Winter | ................ | H04L 63/0876 726/7 |

* cited by examiner

*Primary Examiner* — Michael S McNally
(74) *Attorney, Agent, or Firm* — Jenkins, Wilson, Taylor & Hunt, P.A.

(57) ABSTRACT

Methods, systems, and computer readable mediums for utilizing geographical location information to manage applications in a computer network system are disclosed. According to one example, a method includes receiving, by a global positioning system (GPS) service entity, a request for geographical location information associated with an infrastructure enclosure device from a location request entity, wherein the location request entity is hosted by the infrastructure enclosure device. The method further includes acquiring, by the GPS service entity, the geographical location information from a location enablement device included in the infrastructure enclosure device and sending, by the GPS service module, the acquired geographical location information to the location request entity, wherein the location request entity enforces a policy based on the acquired geographical location information.

20 Claims, 3 Drawing Sheets

METHODS, SYSTEMS, AND COMPUTER READABLE MEDIUMS FOR UTILIZING GEOGRAPHICAL LOCATION INFORMATION TO MANAGE APPLICATIONS IN A COMPUTER NETWORK SYSTEM

TECHNICAL FIELD

The subject matter described herein relates to the monitoring and management of software applications in a computer network system. More specifically, the subject matter relates to methods, systems, and computer readable mediums for utilizing geographical location information to manage applications in a computer network system.

BACKGROUND

A significant number of software applications, for any number of reasons, presently include geographical restrictions that specify permissible (or impermissible) physical locations in which these applications and their associated software constructs (e.g., databases or data containers) may be executed, stored, and/or hosted. For example, some existing U.S. regulations and laws presently mandate that software applications associated with specified encryption algorithms cannot be used in certain designated countries (i.e., for security reasons). Similarly, some software applications may be licensed in such a manner that permits the operation of the application to occur in a single or limited number of physical locations. Another exemplary scenario includes the restricting of citizens' personal healthcare data to be stored in data centers located in a home country. In order to comply with such restrictions, geographical data specific to the application location can be coded directly into the applications and/or supporting components upon release or installation. However, in many cases, this geographical location information is only registered and/or established once and is very rarely updated. Moreover, software applications are also frequently transferred or reassigned to different host servers in order to benefit from the efficiencies afforded by cloud computing networks. Consequently, the management of these applications from a geographical and physical location standpoint has become a largely difficult task for system administrators.

SUMMARY

Methods, systems, and computer readable mediums for utilizing geographical location information to manage applications in a computer network system are disclosed. According to one embodiment, a method includes receiving, by a global positioning system (GPS) service entity, a request for geographical location information associated with an infrastructure enclosure device from a location request entity, wherein the location request entity is hosted by the infrastructure enclosure device. The method further includes acquiring, by the GPS service entity, the geographical location information from a location enablement device included in the infrastructure enclosure device and sending, by the GPS service module, the acquired geographical location information to the location request entity, wherein the location request entity enforces a policy based on the acquired geographical location information.

BRIEF DESCRIPTION OF THE DRAWINGS

The subject matter described herein will now be explained with reference to the accompanying drawings of which.

DETAILED DESCRIPTION

Figure 1:
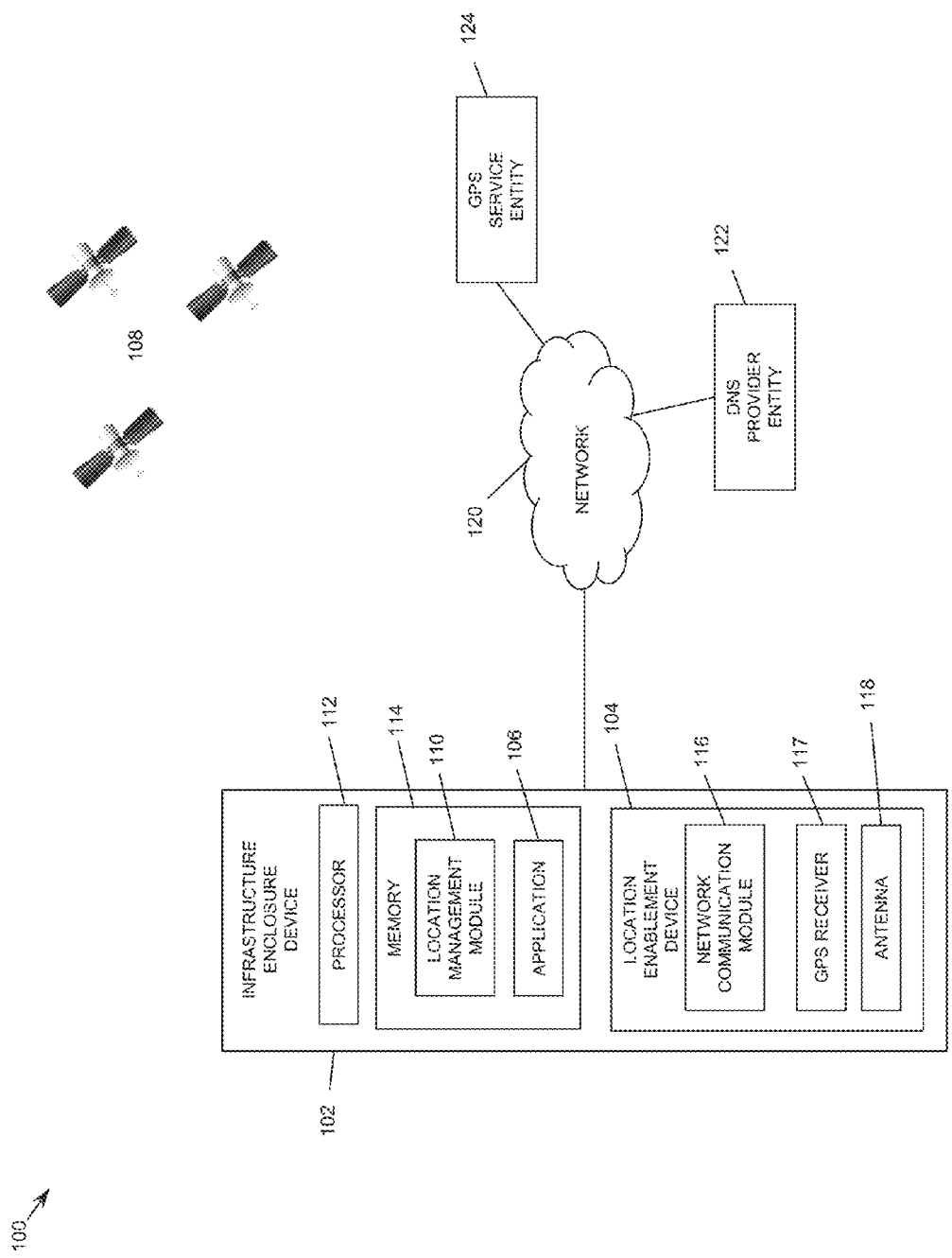
FIG. 1 illustrates an exemplary network system for utilizing geographical location information to manage applications in a computer network system in accordance with embodiments of the subject matter described herein.

The subject matter described herein discloses methods, systems, and computer readable mediums for utilizing geographical location information to manage applications in a computer network system. Notably, the disclosed subject matter includes a location enablement device that is configured to determine the physical location of an infrastructure enclosure device, which may be hosting applications subject to geographical restrictions, in response to a geographical location request sent from a location request entity (e.g., a software application or a data container hosted by the infrastructure enclosure device). In some embodiments, the location enablement device may include a global positioning system (GPS) receiver device configured to receive, from GPS satellites, GPS signal data that may subsequently be processed to yield the physical location (e.g., a city, state, country, etc.) of the infrastructure enclosure device. Similarly, the location enablement device may be equipped with a network communications module that is configured to connect to an API-based GPS service module that is configured to receive the geographical location information (e.g., GPS signal data or derived GPS coordinates) from the location enablement device. Once obtained, the geographical location information may be provided to the original location request entity (e.g., a software application) by the GPS service module. The location request entity may subsequently utilize the geographical location information to enforce a policy. Notably, the disclosed subject matter provides an effective solution for managing geographically sensitive software applications hosted by mobile infrastructure enclosure devices.

Reference will now be made in detail to exemplary embodiments of the subject matter described herein, examples of which are illustrated in the accompanying drawings. Wherever possible, the same reference numbers will be used throughout the drawings to refer to the same or like parts.

In some embodiments, the disclosed subject matter can be utilized within a computer network system that is distributed among a plurality of discrete network segments, such as a single computer network system location or geographically separated computer network system. For example, one exemplary network system may include an integrated infrastructure system and/or device, such as a converged infrastructure (CI). Although the following disclosure describes the use of a CI, any integrated infrastructure device may be utilized without departing from the scope of the present subject matter. As used herein, a CI, such as a Vblock™ System from VCE Company, LLC, can include multiple converged infrastructure components in a preconfigured, pretested, and/or prepackaged computing platform that may be customized to the requirements of a user. For example, a CI can include a single computing platform unit associated with racks of physical CI components and related software for performing virtualization and/or other information technology (IT) functions. In some embodiments, each CI component associated with a CI may include a compute component, a software component, a networking component, a hardware component, or a firmware component. For example, a CI can contain one or more data storage devices, compute devices (e.g., a unified computing system device), networking equipment (e.g., switch devices), and software for managing physical resources and/or virtualized resources (e.g., virtual servers).

FIG. 1 is a block diagram illustrating an exemplary network system, generally designated 100, according to an embodiment of the subject matter described herein. Network system 100 includes an infrastructure enclosure device 102, a communications network 120, a domain name service (DNS) provider entity 122, and a GPS service entity 124. In some embodiments, infrastructure enclosure device 102 may include an infrastructure industry standard rack, a suitable infrastructure container, an infrastructure shipping container, or any like structure that can be used to accommodate a CI. Moreover, communications network 120 may comprise any core communications network (e.g., e.g., the Internet, an intranet, or any like network), which may be used to communicatively connect infrastructure enclosure device 102 to both DNS provider entity 122 and GPS service entity 124. In some embodiments, DNS provider entity 122 may include any server or network element that is configured to maintain and store domain name and IP address/port information (e.g., a DNS server) corresponding to various network servers and/or services. Similarly, GPS service entity 124 may include any server or network element that can be operated by an authorized and authenticated service entity that is configured for receiving requests from clients for geographical location information (e.g., GPS coordinate data and/or GPS satellite signal data), acquiring the geographical location information, and subsequently providing the geographical location information to the requesting clients. Although FIG. 1 depicts DNS provider entity 122 and GPS service entity 124 as separate and distinct network elements, entities 122-124 may, in some embodiments, reside within infrastructure enclosure device 102 without departing from the scope of the disclosed subject matter.

In some embodiments, infrastructure enclosure device 102 may be utilized to host and support the execution of at least one software application 106. As used herein, an application may include an entire software program or any portion thereof that utilizes a plurality of processes (e.g., subprograms, workload services, software algorithms, etc.) to perform an activity or service that may be beneficial to a user. In some embodiments, application 106 may comprise a software data container construct configured to hold sensitive information, such as financial record data, personal health record data, or the like. Notably, application 106 may also be configured to include a data field that contains a geographical restriction parameter. The geographical restriction parameter may either define a permissible geographical location in which application 106 may be stored and/or operated or a prohibited geographical location in which application 106 may not be stored and/or operated. Exemplary applications include, but are not limited to, a health provider account application, a web-based banking application, a gambling application, and the like.

In some embodiments, infrastructure enclosure device 102 may include at least one processor 112 and at least one memory 114. In some embodiments, processor 112 that may include a microprocessor, a central processing unit (CPU), or any other like hardware based processor unit. Likewise, memory 114 may include random access memory (RAM), read only memory (ROM), optical read/write memory, cache memory, magnetic read/write memory, flash memory, or any other non-transitory computer readable storage medium. Notably, processor 112 and memory 114 may be used to execute and manage a location management module 110 and, in some embodiments, network communication module 116 and GPS service entity 124 (if located on or within device 102). In some embodiments, infrastructure enclosure device 102 may comprise a CI wherein processor(s) 112 and memory 114 are embodied as one or more CI compute components (as described below in the description of FIG. 2). For example, each CI compute component includes one or more processors and memory (similar to processor 112 and memory 114 in form and function) that may be used to support and/or execute location management module 110 and other software programs and module residing on the CI. In some embodiments, infrastructure enclosure device 102 may be configured with an advanced management pod (AMP) that, similar to a compute component, includes a processor(s) and memory that are configured to manage and execute the aforementioned software components.

In some embodiments, GPS service entity 124 may be configured to receive a request for geographical location information from a location request entity that resided in infrastructure enclosure device 102. For example, a location request entity may include an application (e.g., application 106) and/or an associated software data container that is hosted by infrastructure enclosure device 102. Notably, application 106 may include any software construct that may be configured to update its own geographical location information and/or enforce policies based on that geographical location information. In other embodiments, the location request entity may comprise a CI or component residing therein (e.g., a management platform module (MPM) or a compute component), which requests geographical location information for the use and benefit of applications supported by one or more of the compute components hosted by the CI.

The manner in which GPS service entity 124 may receive the request for geographical location information largely depends on whether the location request entity is presently aware of the network location of GPS service entity 124. In some embodiments, application 106 may be coded or programmed to include the network address information of GPS service entity 124. In such scenarios, application 106 may send a request directly to GPS service entity 124 as needed. However, in other embodiments, application 106 may not be aware (e.g., not coded or programmed with address information) of the network location of GPS service entity 124. In such situations, application 106 may send a DNS SRV record request message to DNS provider entity 122 that requests network location information associated with network elements providing GPS service. In response to receiving the SRV record request, DNS provider 122 may respond with DNS SRV record response that indicates the network location (e.g., the hostname and port number) of one or more GPS service provider servers, such as GPS service entity 124. Specifically, DNS provider entity 122 may include a configuration file that includes a DNS line entry that identifies GPS service entity 124 as a GPS service provider. An exemplary DNS line entry may be formatted as:

_gps._tcp.GpsServiceEntity.abc.com. 86400 IN SRV 0 5 5060 gps.network.abc.com

Specifically, this DNS line entry points to TCP port 5060 of GPS service entity 124 (which may be contacted at gps.network.abc.com). Accordingly, DNS provider entity 122 may extract this information from the DNS configuration file and include it in the DNS SRV response message to be sent to application 106. Upon receiving the DNS SRV record response, application 106 may utilize the provided DNS information to send a request for GPS service to GPS service entity 124. For example, application 106 may be configured to send a geographical location service request message that comprises an API call configured to communicate with GPS service entity 124.

In some embodiments, GPS service entity 124 may be configured to obtain one or more authentication certificates associated with the location request entity, i.e., application 106. For example, GPS service entity may communicate with a certificate authority (CA) entity in order to obtain a digital certificate corresponding to application 106. Obtaining such a certificate establishes GPS service entity 124 as a trusted third party service entity to application 106. Through the utilization of public and private keys derived from the digital certificate, GPS service entity 124 may be enabled to successfully receive and fulfill geographical location service requests made by the location request entity (e.g., application 106). In some embodiments, application 106 may also need to obtain a digital certificate associated with GPS service entity 124 from the CA entity for the same reasons indicated above. After utilizing the digital certificate(s) to establish a proper communication channel, GPS service entity 124 may be configured to process the received geographical location service request message. For example, GPS service entity 124 may then be configured to contact location enablement device 104 via network communication module 116 to request the acquisition of the requested geographical location information (i.e., GPS signal data). In some embodiments, GPS service entity 124 may communicate with location enablement device 104 via a plurality of communication methods including, but not limited to, a secured and encrypted communications path utilizing Transport Layer Security over IP (along with any other protocols used by the API(s) of GPS service entity 124).

In some embodiments, location enablement device 104 may be equipped with a network communication module 116 that comprises a network enablement component and an API enablement component (not shown), both of which permit location enablement device 104 to communicate with other network entities (e.g., DNS provider entity 122 and GPS service entity 124) via communication network 120. In some embodiments, network communication module 116 may comprise a component separate from location enablement device 104. In such an embodiment, module 116 may be coupled to location enablement device 104 via a USB, serial, Ethernet, or any like cable connection. Depending on the embodiment, location enablement device 104 may be positioned and/or physically attached on or integrated within infrastructure enclosure device 102. Similarly, location enablement device 104 may comprise either a single device (as shown in FIG. 1) or several devices functioning together to obtain and provide GPS data.

Upon receiving a geographical location information request from GPS service entity 124, location enablement device 104 may be configured to acquire the requested geographical location information. For example, location enablement device 104 may send a location data request message to a GPS receiver device 117. In response, GPS receiver device 117 may utilize antenna 118 and GPS chipset (not shown) to receive GPS signal data from a plurality of GPS satellites 108 (e.g., Block-series satellites implemented in the Navstar GPS or like satellite systems). Depending on the embodiment, antenna 118 may be embodied as an external antenna or be integrated within location enablement device 104. In some embodiments, after receiving the GPS signal data from GPS satellites 108, GPS receiver device 117 may be configured to process the GPS signal data in order to derive GPS coordinate data (e.g., latitude and longitude coordinate data). Once the GPS coordinate data is determined, location enablement device 104 may be configured to provide the geographical location information to GPS service entity 124. In other embodiments, location enablement device 104 simply forwards the GPS signal data to GPS service entity 124.

After receiving the geographical location information (e.g., GPS coordinates or GPS signal data) from location enablement device 104, GPS service entity 124 may forward the information to the location request entity. Notably, upon receiving the requested geographical location information, the location request entity may perform a number of actions. For example, application 106 may be configured to utilize the GPS signal data or the derived GPS coordinates to determine the geographical location of infrastructure enclosure device 102 (i.e., the location of application 106). For example, application 106 may include or have access to a database that maps GPS coordinates to geographical locations (e.g., street addresses, zip code regions, area code regions, counties, states, countries, etc.). Notably, the geographical location information provided to application 106 may include the GPS coordinate data that can be used to determine a specified geographical location. Once the geographical location of hosting infrastructure enclosure device 102 is determined, application 106 may be configured to determine if application 106 is located in a compliant or non-compliant area.

In some embodiments, application 106 may be configured to record the geographical location information (i.e., GPS coordinate data and/or corresponding "city", "state", "country", etc.) in a data container or data field associated with application 106. Moreover, application 106 (or a location management module 110) may be configured (e.g., via execution of a subprogram or subroutine) to compare the recently derived geographical location information with a geographical restriction parameter previously defined by application 106. For example, application 106 may include a separate parameter, data field or container configured to store permissible (and/or impermissible) geographical locations in which an infrastructure enclosure device hosting application 106 may (or may not) be physically located. This geographical restriction data may then be compared with the determined geographical location data in order to make the assessment. For example, application 106 may be configured to compare a permissible zip code, address, state, and/or country with an area identified by the recently obtained/derived GPS coordinates.

In the event the geographical location information matches the geographical restriction designated by application 106 (e.g., the GPS coordinates correspond to a location associated with a non-compliant country), then application 106 may be configured to perform one or more remediation actions in accordance to one or more established policies. Depending on the embodiment, the policies may be stored in application 106 itself or in separate software application or database maintained by infrastructure enclosure device 102. In some embodiments, a policy may specify that a notification message or an alert signal be sent to a system administrator if the geographical restriction parameter corresponds to or matches the GPS coordinates. For example, the notification message (e.g., an email message, a text message, a system-based message, etc.) may provide a system administrator with an indication that application 106 should be transferred to another host system (e.g., a CI) located in a geographically compliant area. In other embodiments, a policy may direct application 106 to delete or disable (e.g., discontinue its service) itself immediately or after an elapsed period of time. In some embodiments, an established policy may be configured to instruct application 106 to notify a designated service that is configured to relocate and/or transfer applications of an impermissible location status. In such a scenario, application 106 may be transferred to a geographically compliant host system or server by the aforementioned service. In some embodiments, application 106 may be further configured to differentiate between a number of "risk profiles" that are established based on a predefined distance existing between the current location of the location request entity and a geographical location designated as non-compliant. More specifically, application 106 may be configured with different protocols that are respectively mapped to varying geolocation ranges (e.g., proximity of device 102 to a defined non-compliant location). For example, if application 106 determines that device 102 is physically located within a first predefined range (e.g., between 1 and 10 miles) with respect to a prohibited area, application 106 may be configured to perform a first remediation action (e.g., send a notification message). Likewise, if application 106 determines that device 102 is physically located within a second predefined range (e.g., within 1 mile) with respect to the prohibited area, application 106 may be configured to execute a second remediation action (e.g., an application location transfer) that differs from the first remediation action (or alternatively, execute both the first and second remediation actions).

In some embodiments, location management module 110 in infrastructure enclosure device 102 may be configured to perform these remediation measures in lieu of application 106 upon request by application 106. In addition, location management module 110 may also be configured to perform a policing function that effectively monitors the operation and implementation of all applications residing within infrastructure enclosure device 102. For example, location management module 110 may be configured to detect events involving the improper and/or unusual use of designated ports by any of the hosted applications 106. Similarly, location management module 110 may be provisioned with a whitelist of permissible application locations and/or a blacklist of applications non-compliant locations that can be periodically compared to recently obtained geographical location information. In such a scenario, location management module 110 would function as a location request entity proxy for each of the applications 106 residing in infrastructure enclosure device 102. For example, location management module 110 may be configured to facilitate the interworking and/or interfacing of application 106 with GPS service entity 124.

Figure 2:
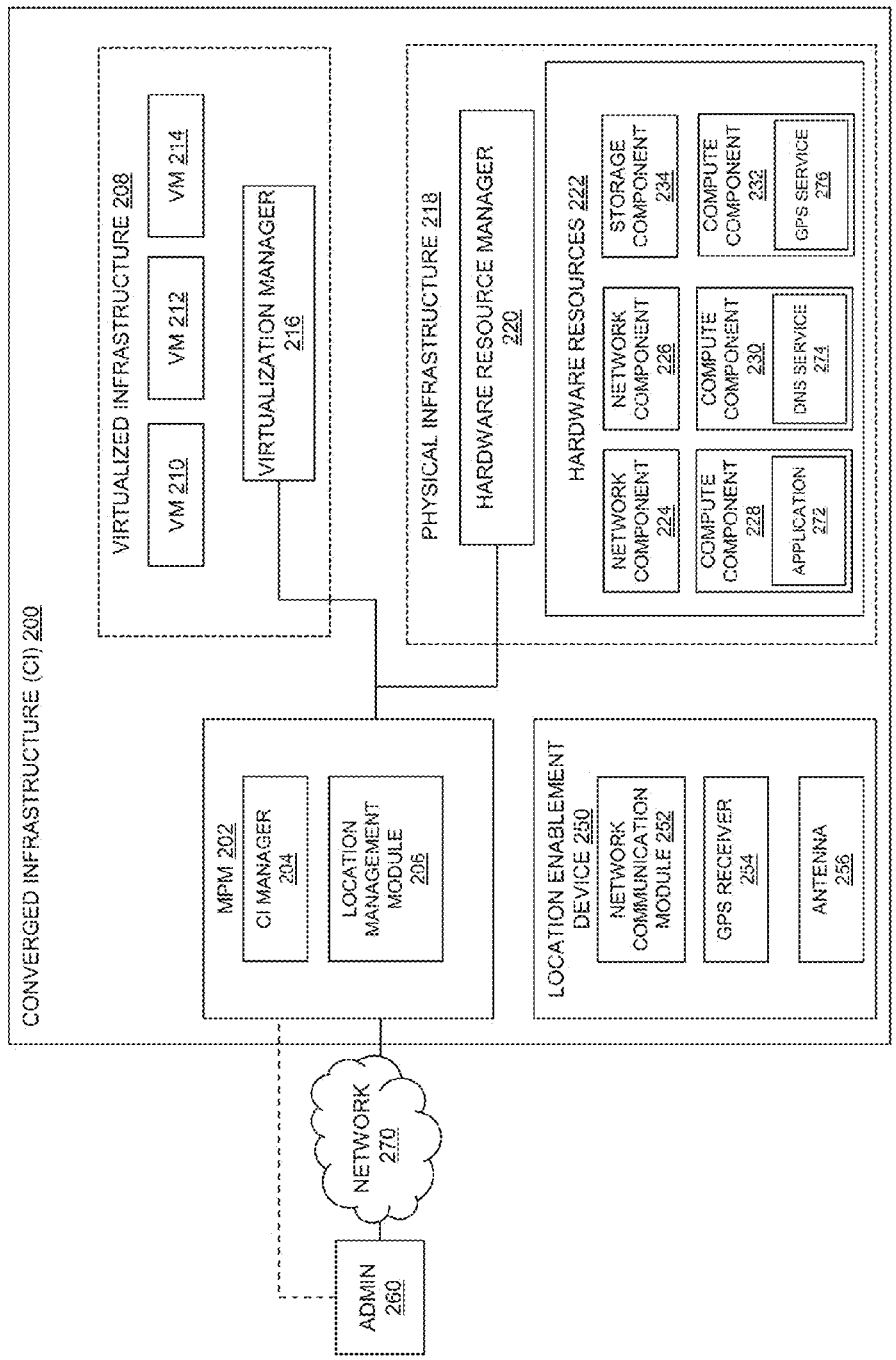
FIG. 2 illustrates an exemplary converged infrastructure for utilizing geographical location information to manage applications in a computer network system in accordance with embodiments of the subject matter described herein.

As indicated above, the disclosed subject matter can be utilized in a converged infrastructure system. FIG. 2 is a diagram illustrating a logical representation of an exemplary CI 200 according to an embodiment of the subject matter described herein. In some embodiments, CI 200 can comprise a plurality of infrastructure elements, including one or more physical resources and one or more virtual resources. Exemplary physical resources can comprise a processor, a compute device, network equipment, a router, a switch, wiring or cabling, a storage device, a physical port, and/or a communications interface. Exemplary virtual resources can comprise a virtual entity (e.g., an entity that appears as a physical entity but is instead supported and/or hosted by one or more CI components associated with one or more CIs), a virtual machine, a virtual server, a virtual storage device, a virtual port, and/or a virtual communications interface. Notably, FIG. 2 depicts an embodiment in which the GPS service entity and the DNS provider entity are supported and/or hosted by CI components located within CI 200 (or any other stand-alone integrated infrastructure device) as opposed to residing throughout the distributed network depicted in FIG. 1.

In some embodiments, CI 200 includes a management platform module (MPM) 202, which may comprise a self-contained management infrastructure component or device configured to perform management and monitoring functions for the CI platform. In some embodiments, MPM 202 may be configured to host CI manager 204 and location management module 206. MPM 202 may be further configured to include at least one hardware processor and memory that may be utilized to perform a number of functions, such as hosting the CI management software (e.g., CI manager 204), hosting update managers, and executing location management module 206 in the manner described below. In some embodiments, MPM 202 may be embodied as a dedicated and/or specialized compute component configured for performing the management and monitoring functions of CI 200. In addition, MPM 202 may be deployed as one or more rack mounted servers that include one or more processors and memory (e.g., similar to and/or incorporated within at least one of compute components 228-232). One exemplary embodiment of MPM 202 may comprise an advanced management platform or advanced management pod provisioned in the Vblock™ System from VCE Company, LLC).

In some embodiments, CI 200 can be configured to provide data storage functionality, cloud service functionality, and/or other IT functionality which can support a vast number of software applications. CI 200 can also be configured to communicate with various other entities, such as other CIs, network nodes, and users. For example, user 260 (e.g., a human administrator/operator or an automated system) may use an application programming interface (API), a command line interface, or web-based graphical user interface to login to CI 200 to access MPM 202 and/or CI manager 204. In some embodiments, user 260 may establish communication directly with CI 200 without use of network 270.

In some embodiments, CI manager 204 (e.g., a CI management module) can be used to manage the operation of CI resources in a virtualized infrastructure 208 and a physical infrastructure 218. Specifically, CI manager 204 may be any suitable entity for managing the operation of CI 200 and may be configured to communicate with various CI components, such as virtual resources, physical resources, and/or software for managing the various CI components. In some embodiments, CI manager 204 comprises VCE Vision™ Intelligent Operations software and/or firmware that may be executed by a processor within MPM 202 or any other processing unit present in CI 200 (e.g., a processor on one of compute components 228-232).

In some embodiments, virtualized infrastructure 208 can comprise a virtualization environment configured to simulate components of a computing device, e.g., a processor, system memory, and a storage device, for executing one or more virtual machines (VMs) managed by virtualization manager 216. For example, each of VM 210, VM 212, and VM 214 may be configured to perform various functions and/or services, such as web server functions or cloud application services, and may interact with various nodes, components, and/or users. In some embodiments, virtualized infrastructure 208 may be associated with one or more virtual entities. Each virtual entity can comprise one or more CI or portions therein, such as infrastructure elements from one or more CIs. In some embodiments, virtualization manager 216 may allow logical entities to be created, deleted, or modified using an API, a GUI, or a CLI. Virtualization manager 216 may be any suitable entity (e.g., software executing in a virtual machine) for managing aspects associated with virtualized infrastructure 208. In some embodiments, virtualization manager 216 may be configured to provide management functionality through one or more communications interfaces. For example, virtualization manager 216 may communicate with location management module 206 using one or more APIs.

Likewise, physical infrastructure 218 can comprise hardware resources 222, such as network components 224-226, compute components 228-232 (sometimes referred to as "hosts", compute devices, and/or compute servers), storage component 234, which may comprise a storage area network (SAN) that includes a plurality of data storage elements that are managed by hardware resource manager 220. In some embodiments, hardware resource manager 220 may be configured to provision hardware resources 222 via one or more communications interfaces. For example, hardware resource manager 220 may provision hardware resources 222 in order to implement one or more virtual entities in virtualized infrastructure 208. In some embodiments, hardware resource manager 220 can configure compute components 228-232 and storage component(s) 234 to be cooperatively utilized for implementing and supporting VM 210-214 and virtualization manager 216. For example, compute component 228 and storage component 234 may be used in implementing VM 210 and VM 212 and compute component 230 and storage component 234 may be used in implementing VM 214 and virtualization manager 216. Similarly, hardware resources 222 may also include network components 224-226 (e.g., network switches), which can be configured to enable communication between the resources within the CI.

With respect to the disclosed subject matter, any one of CI components 224-234 may be configured to host a location request entity. For example, in the embodiment illustrated in FIG. 2, compute component 228 is depicted as hosting an application 272 (e.g., a location request entity). Moreover, FIG. 2 further depicts compute component 230 hosting a DNS service module 274 (i.e., not unlike DNS provider entity 122 in FIG. 1) and compute component 232 hosting a GPS service module 276 (i.e., not unlike GPS service entity 124 in FIG. 1). In some embodiments, application 272 may act a location request entity and send a geographical location service request message to GPS service module 276 via hardware resource manager 220. In alternate embodiments, location management module 206 in MPM 202 may send the geographical location service request message by serving as a location request entity proxy for application 272.

The manner in which GPS service module 276 receives the request for geographical location information largely depends on whether the location request entity is presently aware of the network location of GPS service module 276. In some embodiments, application 106 may be coded or programmed to include the network address information of GPS service entity 124. In such scenarios, application 106 may send a geographical location service request message directly to GPS service module 276 as needed. However, in other embodiments, application 272 may not be aware (e.g., not coded or programmed with address information) of the CI network location of GPS service module 276. In such scenarios, application 272 may send a DNS SRV record request message to DNS service module 274 that requests network location information associated with GPS service providers hosted by CI 200. In response to receiving the SRV record request, DNS service module 274 may respond with DNS SRV record response that indicates the location (e.g., the hostname and port number) of one or more local GPS service providers, such as GPS service module 276. In some embodiments, DNS service module 274 includes a configuration file containing a DNS line entry that identifies GPS service module 276 and may be formatted as:

_gps._tcp.xblock.abc.com. 86400 IN SRV 0 5 5060 gps.xblock.abc.com

Specifically, this DNS line entry points to TCP port 5060 of compute component 232 which is hosting GPS service module 276 (which may be contacted at gps.xblock.abc.com). In some embodiments, DNS service module 276 may extract this information from the DNS configuration file and include it in the DNS SRV response message directed to application 272. Upon receiving the DNS SRV record response, application 272 may utilize the provided DNS information to send a request for GPS service to GPS service module 276. For example, application 272 may be configured to send a geographical location service request message that comprises an API call configured to communicate with GPS service module 276.

In some embodiments, GPS service module 276 may be configured to authenticate itself to application 272, or any other location request entity. For example, GPS service module 276 may be configured to obtain authentication certificates associated with applications (e.g., application 272) executed by and/or residing on CI components 224-234 from a CA entity (not shown) The obtained authentication certificate(s) may be utilized by GPS service module 276 to establish and maintain communications between GPS service module 276 and the location request entity (e.g., application 272). In some embodiments, location management module 206 may be configured to utilize the authentication certificates to facilitate the communication between GPS service module 276 and application 272. Notably, in both scenarios, the utilization of the authentication certificates enables GPS service module 276 to be recognized as a trusted third party service provider by application 272. Through the utilization of public and private keys derived from the digital certificate, GPS service module 276 may be enabled to successfully receive and fulfill geographical location service requests made by application 272. In some embodiments, application 272 may also need to obtain a digital certificate associated with GPS service module 276 from the CA entity for the same reasons indicated above. After utilizing the digital certificate(s) to establish a proper communication channel, GPS service module 276 may be configured to process the received geographical location service request message. For example, GPS service module 276 may then be configured to contact location enablement device 250 via a network communication module 252 to request the acquisition of the requested geographical location information (i.e., GPS signal data).

In some embodiments, location enablement device 250 may receive a geographical location information request from a GPS service module 276. In response, location enablement device 250 may be configured to acquire the requested geographical location information by sending a message instructing GPS receiver device 254 to acquire GPS signal data. GPS receiver device 254 may then utilize antenna 256 and a GPS chipset to receive GPS signal data from GPS satellites (e.g., GPS satellites 108 in FIG. 1). After receiving the GPS signal data from the GPS satellites, GPS receiver device 254 can derive GPS coordinate data. For example, location enablement device 250 may utilize the GPS coordinate data to determine the corresponding GPS coordinates of CI 200. Upon determining the GPS coordinate data (or alternatively, acquiring GPS signal data), location enablement device 250 may then be configured to forward the geographical location information to GPS service entity 276. GPS service entity 276 may then, in turn, provide the geographical location information to the original location request entity (e.g., application 272 or location management module 206).

After receiving the geographical location information (e.g., GPS coordinates or GPS signal data) from location enablement device 250, GPS service module 276 may forward the information to the location request entity (e.g., application 272 or location management module 206). Notably, upon receiving the requested geographical location information, the location request entity may perform a number of actions. For example, application 106 may be configured to utilize the GPS signal data or the derived GPS coordinates to determine the geographical location of CI 200 (i.e., the location of application 272). For example, application 272 may include or have access to a database that maps GPS coordinates to geographical locations (e.g., street addresses, zip code regions, area code regions, counties, states, countries, etc.). Notably, the geographical location information provided to application 272 may include the GPS coordinate data that can be used to determine a specified geographical location. Once the geographical location of host CI 200 is determined, application 272 (or location management module 206) may be configured to determine if application 272 is located in a compliant or non-compliant area.

In the event a location request entity (e.g., application 272 or location management module 206) determines that the obtained and/or derived geographical location information matches or corresponds to a geographical restriction parameter (e.g., the GPS coordinates corresponding to a location in a restricted country) designated by supported application 272, the location request entity may be configured to perform one or more remediation actions in accordance to one or more established policies. Depending on the embodiment, the policies may be stored in the supported application 272 or in separate software application or database (e.g., storage component 234 or memory elements in compute components 228-232) maintained by CI 200. In some embodiments, a policy may specify that a notification message or an alert signal is to be sent to a system administrator if the geographical restriction parameter corresponds to or matches recently determined GPS coordinates. For example, the notification message (e.g., an email message, a text message, a system-based message, etc.) may provide a system administrator with an indication that application 272 should be transferred to another CI or host system that is physically located in a geographically compliant area. In other embodiments, a policy may specify that message, etc.) may provide a system administrator with an indication that application delete or disable itself after a predetermined time period. In some embodiments, application 272 may be configured to notify a designated service or location management module 206, which can relocate and/or transfer applications currently positioned in an impermissible location. In such a scenario, application 272 may be transferred to a geographically compliant CI or host system by the aforementioned service.

In some embodiments, MPM 202 and/or location management module 206 may be configured to perform the aforementioned remediation measures in lieu of supported application 272 on CI 200. For example, location management module 206 may be configured to function as a geographical compliance check entity for CI 200 (instead of the application itself). Notably, location management module 206 (and/or MPM 202) may be configured to communicate with hardware resource manager 220 in order to obtain information identifying applications residing on and/or supported by CI components 224-234 that include a geographical restriction parameter value that does not comply with the determined geographical location of CI 200. For example, upon receiving the present geographical location information associated with CI 200 from location enablement device 250, location management module 206 may be configured to compare the geographical restriction parameter of the location request entity (e.g., application 272 residing on compute component 228) with the determined location of CI 200 on a periodic basis.

As indicated above, the subject matter disclosed herein can be implemented in software in combination with hardware and/or firmware. For example, the subject matter described herein can be implemented in software executed by a processor unit (e.g., a processor included in one or more of compute components 228-232 in FIG. 2). In one exemplary implementation, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, location management module 206, GPS service module 276, and DNS service module 274, may be located at a single computing system or may be distributed across one or more devices, platforms, and/or systems. As used in the present disclosure, the terms "function" or "module" refer to hardware, firmware, or software in combination with hardware and/or firmware for implementing features described herein.

It will be appreciated that FIG. 2 illustrates an exemplary embodiment and that various nodes, their locations, and/or their functions as described above in relation to FIG. 2 may be changed, altered, added, or removed.

Figure 3:
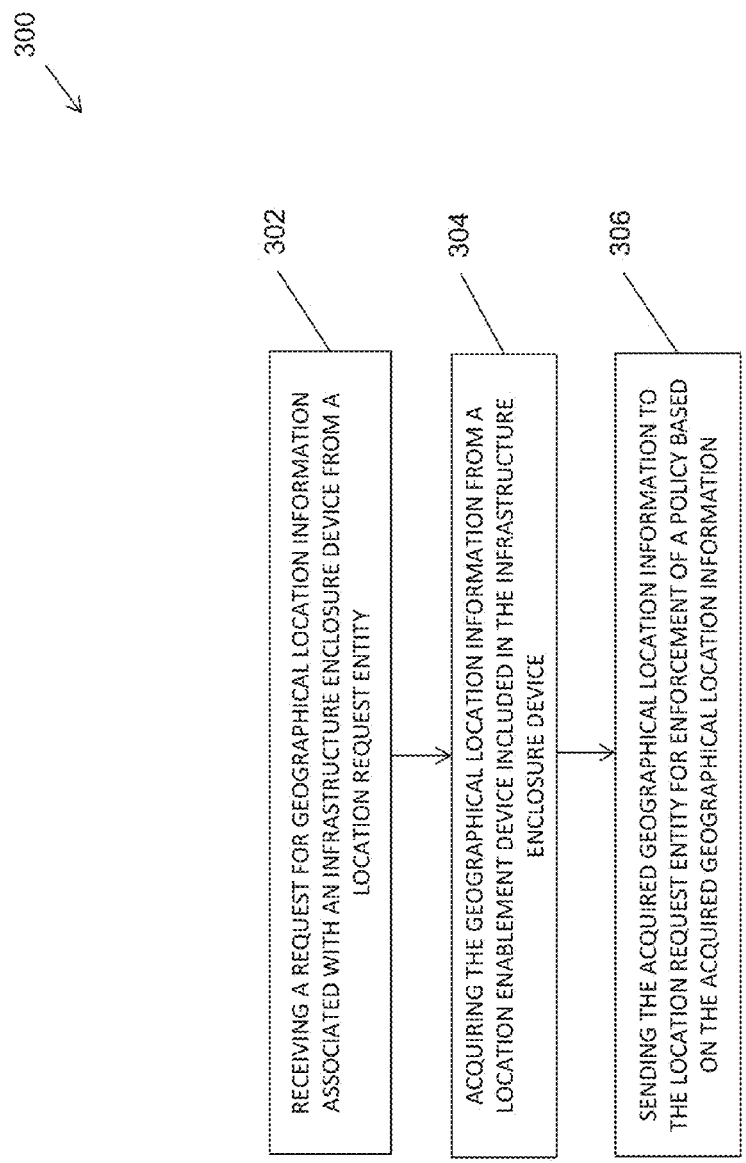
FIG. 3 illustrates a flow chart of an exemplary process for utilizing geographical location information to manage applications in a computer network system in accordance with embodiments of the subject matter described herein.

FIG. 3 illustrates a flow chart of an exemplary method 300 for utilizing geographical location information to manage applications in a computer network system in accordance with embodiments of the subject matter described herein. The following process is also described with respect to CI 200 in FIG. 2 as an exemplary embodiment.

In step 302, a request for geographical location information associated with an infrastructure enclosure device is received from a location request entity. For example, GPS service module 276 in CI 200 receives a request message from application 272 stored in and/or executed by CI 200. Depending on the embodiment, the location request entity may be programmed with the network location of GPS service module 276 or may need to request the network location of GPS service module 276 from a DNS service module via an SRV record request.

In step 304, the geographical location information is acquired. In some embodiments, GPS service module 276 communicates with location enablement device 250 via network communication module 252 to request the acquisition of GPS signal data. Notably, location enablement device 250 utilizes GPS receiver device 254 and antenna 256 to receive GPS signals from a plurality of GPS satellites (e.g., satellites 108 as shown in FIG. 1). In some embodiments, GPS receiver device 254 may also be configured to process the received GPS signal data to derive GPS coordinates and/or a physical location of CI 200. In other embodiments, location enablement device 250 acquires and simply forwards the GPS signal data to GPS service module 276.

In step 306, the geographical location information is sent to the location request entity for policy enforcement based on the acquired geographical location information. In some embodiments, GPS service module 276 sends the geographical location information (e.g., GPS signal data or derived GPS coordinates) to the location request entity, e.g., application 272 or location management module 206. Application 272 in turn processes the geographical location information to determine whether CI 200 is in a geographically compliant area. Upon determining that the geographical location of CI 200 (which hosts the location request entity) correlates with an impermissible area, the location request entity may then be configured to enforce its own established policies.

As indicated above, the subject matter described herein can be implemented in software in combination with hardware and/or firmware. For example, the subject matter described herein can be implemented in software executed by a hardware processor. In one exemplary implementation, the subject matter described herein can be implemented using a computer readable medium having stored thereon computer executable instructions which, when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While the systems and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method for utilizing geographical location information to manage applications in a computer network system, the method comprising:
    receiving, by a global positioning system (GPS) service entity, a request for geographical location information associated with an infrastructure enclosure device from a location request entity, wherein the location request entity is hosted by the infrastructure enclosure device and includes a geographical restriction parameter that defines at least one selected from a group consisting of a permissible geographical location in which the location requesting entity may be stored and an impermissible geographical location in which the location requesting entity may not be stored;
    acquiring, by the GPS service entity, the geographical location information from a location enablement device included in the infrastructure enclosure device; and
    sending, by the GPS service entity, the acquired geographical location information to the location request entity, wherein the location request entity enforces a policy based on the acquired geographical location information.

2. The method of claim 1 wherein a network address of the GPS service entity is acquired from programmed information contained within the location request entity and is used to send the request for geographical location information by the location request entity.

3. The method of claim 1 wherein a network address of the GPS service entity is acquired by the location request entity via an SRV record response message sent from a queried DNS server and is subsequently used to send the request for geographical location information.

4. The method of claim 1 wherein the GPS service entity acquires one or more authentication certificates associated with the location request entity from a certificate authority that enables the GPS service entity to be recognized as a trusted third party service entity by the location request entity.

5. The method of claim 1 wherein the acquired geographical location information includes GPS signal data or GPS coordinate data associated with a current location of the infrastructure enclosure device.

6. The method of claim 1 wherein the location request entity is configured to execute a remediation action established by the policy in the event the acquired geographical location information fails to comply with a geographical location restriction established by the policy.

7. The method of claim 1 wherein the location request entity includes one of a group consisting of a converged infrastructure (CI), a software application, and a software data container construct.

8. A system for utilizing geographical location information to manage applications in a computer network system, the system comprising:
    at least one processor;
    memory; and
    a global positioning system (GPS) service module utilizing the at least one processor and the memory, wherein the GPS service module is configured to:
        receive a request for geographical location information associated with an infrastructure enclosure device from a location request entity, wherein the location request entity is hosted by the infrastructure enclosure device and includes a geographical restriction parameter that defines at least one selected from a group consisting of a permissible geographical location in which the location requesting entity may be stored and an impermissible geographical location in which the location requesting entity may not be stored,
        acquire the geographical location information from a location enablement device included in the infrastructure enclosure device, and send the acquired geographical location information to the location request entity, wherein the location request entity enforces a policy based on the acquired geographical location information.

9. The system of claim 8 wherein a network address of the GPS service module is acquired from programmed information contained within the location request entity and is used to send the request for geographical location information by the location request entity.

10. The system of claim 8 wherein a network address of the GPS service module is acquired by the location request entity via an SRV record response message sent from a queried DNS server and is subsequently used to send the request for geographical location information.

11. The system of claim 8 wherein the GPS service module is further configured to acquire one or more authentication certificates associated with the location request entity from a certificate authority that enables the GPS service module to be recognized as a trusted third party service entity by the location request entity.

12. The system of claim 8 wherein the acquired geographical location information includes GPS signal data or GPS coordinate data associated with a current location of the infrastructure enclosure device.

13. The system of claim 8 wherein the location request entity is configured to execute a remediation action established by the policy in the event the acquired geographical location information fails to comply with a geographical location restriction established by the policy.

14. The system of claim 8 wherein the location request entity includes one of a group consisting of a converged infrastructure (CI), a software application, and a software data container construct.

15. A non-transitory computer readable medium having stored thereon executable instructions which, when executed by a processor of a computer, cause the computer to perform steps comprising:

receiving, by a global positioning system (GPS) service entity, a request for geographical location information associated with an infrastructure enclosure device from a location request entity, wherein the location request entity is hosted by the infrastructure enclosure device and includes a geographical restriction parameter that defines at least one selected from a group consisting of a permissible geographical location in which the location requesting entity may be stored and an impermissible geographical location in which the location requesting entity may not be stored;

acquiring, by the GPS service entity, the geographical location information from a location enablement device included in the infrastructure enclosure device; and sending, by the GPS service entity, the acquired geographical location information to the location request entity, wherein the location request entity enforces a policy based on the acquired geographical location information.

16. The computer readable medium of claim 15 wherein a network address of the GPS service entity is acquired from programmed information contained within the location request entity and is used to send the request for geographical location information by the location request entity.

17. The computer readable medium of claim 15 wherein a network address of the GPS service entity is acquired by the location request entity via an SRV record response message sent from a queried DNS server and is subsequently used to send the request for geographical location information.

18. The computer readable medium of claim 15 wherein the GPS service entity acquires one or more authentication certificates associated with the location request entity from a certificate authority that enables the GPS service entity to be recognized as a trusted third party service entity by the location request entity.

19. The computer readable medium of claim 15 wherein the acquired geographical location information includes GPS signal data or GPS coordinate data associated with a current location of the infrastructure enclosure device.

20. The computer readable medium of claim 15 wherein the location request entity is configured to execute a remediation action established by the policy in the event the acquired geographical location information fails to comply with a geographical location restriction established by the policy.

* * * * *